United States Patent
Heber et al.

(10) Patent No.: US 11,442,602 B2
(45) Date of Patent: Sep. 13, 2022

(54) METHOD FOR THE MANIPULATION OF IMAGE DATA FOR A SCREEN

(71) Applicant: siOPTICA GmbH, Jena (DE)

(72) Inventors: André Heber, Weimar (DE); Markus Klippstein, Jena (DE); Uwe Schroeter, Dornburg-Camburg (DE)

(73) Assignee: siOPTICA GmbH, Jena (DE)

( * ) Notice: Subject to any disclaimer, the term of this patent is extended or adjusted under 35 U.S.C. 154(b) by 59 days.

(21) Appl. No.: 17/054,449

(22) PCT Filed: May 28, 2019

(86) PCT No.: PCT/EP2019/063723
§ 371 (c)(1),
(2) Date: Nov. 10, 2020

(87) PCT Pub. No.: WO2019/229020
PCT Pub. Date: Dec. 5, 2019

(65) Prior Publication Data
US 2021/0232278 A1    Jul. 29, 2021

(30) Foreign Application Priority Data
May 31, 2018   (DE) .................... 10 2018 004 401.8

(51) Int. Cl.
G06F 3/0484      (2022.01)
B60K 35/00       (2006.01)
G06F 3/01        (2006.01)

(52) U.S. Cl.
CPC ............ *G06F 3/0484* (2013.01); *B60K 35/00* (2013.01); *G06F 3/012* (2013.01); *G06F 3/013* (2013.01);
(Continued)

(58) Field of Classification Search
CPC ........ G06F 3/0484; G06F 3/012; G06F 3/013; B60K 35/00; B60K 2370/149;
(Continued)

(56) References Cited

U.S. PATENT DOCUMENTS 9,881,531 B2      1/2018  Klippstein et al.
2012/0215403 A1*  8/2012  Tengler .................. B60K 35/00
                                                 701/36
(Continued)

FOREIGN PATENT DOCUMENTS

DE   10 2009 046 451 A1   5/2011
DE   11 2015 005 433 T5   8/2017
(Continued)

*Primary Examiner* — Phuong H Nguyen
(74) *Attorney, Agent, or Firm* — Christensen, Fonder, Dardi & Herbert, PLLC

(57) ABSTRACT

A method for manipulation of image data for a display screen that can be operated in two operating modes, viz B1 for a free viewing mode and B2 for a restricted viewing mode, comprising: a) switching on the operating mode B2, b) monitoring the eye position of a viewer in a given angular range A, with a signal S being set if the eye position signifies that the viewer is looking at the screen, and being deleted if not looking at the screen, c) manipulating the image data with regard to image parameters, wherein the said manipulation i) is performed to the effect that the quality of the restricted viewing mode B2 is enhanced, ii) is dynamically implemented in a control unit of the display screen, and iii) is performed exclusively while the signal S remains set, and d) repeating steps b) and c) until operating mode B2 concluded.

11 Claims, 1 Drawing Sheet

(52) U.S. Cl.
CPC .. *B60K 2370/149* (2019.05); *B60K 2370/186* (2019.05); *B60K 2370/188* (2019.05); *B60K 2370/349* (2019.05)

(58) Field of Classification Search
CPC ........ B60K 2370/186; B60K 2370/188; B60K 2370/349; G09G 2320/0626; G09G 2320/066; G09G 2320/0666; G09G 2340/0407; G09G 2340/12; G09G 2354/00; G09G 2358/00; G09G 2380/10; G09G 3/20
See application file for complete search history.

(56) References Cited

U.S. PATENT DOCUMENTS

| | | | |
|---|---|---|---|
| 2014/0157424 A1* | 6/2014 | Lee | ................. G06F 21/60 726/26 |
| 2014/0201844 A1 | 7/2014 | Buck | |
| 2016/0191859 A1 | 6/2016 | Lisseman | |
| 2017/0069236 A1 | 3/2017 | Klippstein et al. | |
| 2018/0111552 A1 | 4/2018 | Neiswander et al. | |
| 2018/0335655 A1 | 11/2018 | Alkhimenko et al. | |

FOREIGN PATENT DOCUMENTS

| | | |
|---|---|---|
| DE | 20 2017 105 761 U1 | 4/2018 |
| WO | WO 2015/121398 A1 | 8/2015 |
| WO | WO 2016/109227 A1 | 7/2016 |
| WO | WO 2017/089482 A1 | 6/2017 |
| WO | WO 2018/075203 A1 | 4/2018 |

\* cited by examiner

METHOD FOR THE MANIPULATION OF IMAGE DATA FOR A SCREEN

PRIORITY CLAIM

The present application is a National Phase entry of PCT Application No. PCT/EP2019/063723, filed May 28, 2019, which claims priority from German Patent Application 10 2018 004 401.8, filed May 31, 2018, the disclosures of which are hereby incorporated by reference herein in their entirety.

FIELD OF THE INVENTION

The present disclosure is directed generally to display screens and viewing of display screens. More specifically, the present disclosure is directed to including methods, systems and devices relating to the manipulation of image data for display screens and the effects thereof.

SUMMARY OF THE INVENTION

In recent years, great strides have been made in enlarging the visual angle of LCDs. Frequently, however, there are situations in which such a very large viewing range of a display screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share displayed information with others, e.g., when looking at vacation snaps or reading advertisements, and, on the other hand, a narrow viewing angle needed to keep displayed information private.

A similar problem is encountered in vehicle manufacturing: Here, when the motor is running, the driver must not be distracted by image contents such as digital entertainment shows, whereas a front-seat passenger would like to watch them during the ride. This requires a display screen that can be switched between corresponding display modes, and in the restricted viewing mode provides privacy as perfect as possible.

In WO2015/121398, the applicant describes a display screen that can be operated in two operating modes, i.e. one each for a free and a restricted viewing mode. For switching between the operating modes, this display screen essentially has scattering particles provided in the volume of the accompanying light guide. These scattering particles consist of polymerizate and may, under certain circumstances, especially in case of higher concentration, result in scattering effects that reduce the privacy effect in the restricted mode.

For similar purposes, other methods and arrangements are known wherein the restricted viewing mode often is achieved to a limited extent, especially in case of a dark environment, because there is always some residual light that penetrates into the viewing angles intended for privacy. If; then, the ambient light is faint and, thus, the viewer's pupil is wide open, residual information can often be perceived also from the privacy viewing angles.

Certain applications such as, e.g., inside vehicles, however, demand shielding against unwanted viewing as perfect as possible in all ambient light conditions.

SUMMARY OF THE INVENTION

Departing therefrom, an object of the invention is to describe a method for the manipulation of image data for a display screen that can be operated in at least two operating modes, i.e. one each for a free and a restricted viewing mode, in the restricted viewing mode of which, under certain ambient conditions, at least some residual light can be perceived in angular ranges to be actually shielded, in which way the secure presentation of information by means of the restricted viewing mode can be distinctly enhanced. The method should be implementable in the simplest possible way.

According to the invention, this problem is solved by a method for the manipulation of image data for a display screen that can be operated in at least two operating modes, namely, B1 for a free viewing mode and B2 for a restricted viewing mode, comprising the following steps:
a) Switching on mode B2,
b) Permanent or recurrent monitoring of a viewer's eye position within a given angular range A enclosing a vertical bisector of the display screen (1),
Setting a signal S if the viewer's eye position means that the viewer is looking at the display screen, and
Cutting off signal S if the viewer's eye position means that the viewer is not looking at the display screen,
c) Manipulation of the image data shown on the display screen as against the initial image data with regard to contrast, brightness, resolution, color space, cross fades and/or further image parameters, wherein the said manipulation
  i. is performed in such a way as to bring about a deteriorated visual perceptibility of the image data, whereby the quality of the restricted viewing mode B2 is enhanced,
  ii. is implemented dynamically in a control unit of the display screen (1), and
  iii. is performed exclusively during the period in which the signal S is set,
d) Repetition of steps b) and c) until a given abort condition, e.g., breaking of the mode B2.

Naturally, as a rule, there is another, direct viewer, who in mode B2 (ad in mode B1) may always view the image data shown on the display screen while staying outside the angular range A. The eye position of this viewer is irrelevant within the framework of the invention.

The term "initial image data" denotes the data shown on the display screen when the signal S is not set, i.e., the non-manipulated data. In this connection, the term "brightness" denotes the brightness impressed upon the image data, rather than the total brightness of the display screen adjustable by means of light sources.

Aside from the abort condition of cutting of mode B2 or changing over to mode B1, other abort conditions are feasible, e.g. stopping the engine of a vehicle.

In an extreme case, the manipulation in step c) my mean the complete shutdown of the display screen, with the total invisibility of an image alternatively being reached by manipulation to a Michelson contrast of 0%. Naturally, the said manipulation—which can also be understood as a correction to comply with defaults in operating mode B2—is not active in the free viewing mode B1.

Recurrent monitoring means that monitoring takes place at defined time intervals, e.g. every 0.2 seconds.

The display screen that can be operated in at least two operating modes, i.e. B1 for a free viewing mode and B2 for a restricted viewing mode, is based, e.g., on an LCD or OLED panel. Other configurations are conceivable.

The said deteriorated visual perceptibility of the image data is brought about by poorer contrast, lower brightness, inferior resolution, diminished color space, and/or static or dynamic cross fades relative to the initial image dates. These changes may go a far as to a pure black-and-white presentation. A cross fade eligible for reducing visual perceptibility is, e.g., the cross fading of checkerboard patterns or other regular or irregular patterns. An eligible alternative is, e.g., the high-pas filtering of the respective image data, in order to avoid low frequencies in the image, which as a rule are easily detectable rather.

The influences on contrast, brightness, resolution or color space or the cross fades are put into action dynamically in the display screen's control unit, which is configured, e.g., as an electronic controller board. This putting into action, then, applies to still as well as moving images and can, in addition, be varied in time.

In this context, "dynamic" means that all influences on contrast etc. mentioned above are implemented in real time, i.e. with a latency of less than 0.2 seconds. For this purpose, the control unit of the display screen needs to be designed appropriately. Optionally, a dynamic adaptation also includes that the kind of influences can, or preferably should, adapted to the image contents shown. For example, the presentation of a bright area would not necessarily be changed by the reduction of contrast, whereas, in such a case, clearly the reduction of brightness is particularly helpful to enhance vision protection. Appropriate control processes are implemented in the said control unit.

The invented method gains a particular quality if the said deterioration of perceptibility of the image data is modulated temporally and preferably increases with the time during which the signal S remains set, wherein, optionally, after the period during which the signal S remains set has exceeded a given minimum time t, the display screen is completely switched off, and/or image presentation on the display screen is stopped or interrupted.

When presettable minimum times t1<t2<t3< . . . during which the signal S remains set are exceeded, it is possible, in addition, to send out unpleasant sound signals that become louder and/or more unpleasant as another minimum time is exceeded. Instead such sound signals one can also use other kinds of signals to target the viewer's senses, e.g., a cross fade with the request to look away and/or a tangible vibration, as in a vehicle, e.g., in the steering wheel or the driver's seat.

Monitoring the eye position with minor delay—less than 0.2 s, i.e. in real time—is preferably implemented by an eye tracking system, wherein at least the viewing angle of both eyes in horizontal and/or vertical direction for the angular range A and optionally the viewer's head position relative to the display screen should be taken into account, in order to determine whether or not the signal S is to be set. Suitable eye tracking systems are known in prior art and can be adapted by persons skilled in the art. For a display screen the surface of which is not aligned in parallel with the earth's surface, the terms "horizontal" and "vertical" are, as a rule, to be understood as absolute terms, i.e. parallel or normal to the earth's surface, respectively. For display screens that rest on their backs, but also for most of the display screens installed in vehicles, the horizontal direction corresponds to the direction of the longer side, and the vertical direction to that of the shorter side, of a rectangular display screen, if that is aligned in the landscape mode.

The invented method is applicable to advantage in a vehicle, with the viewer corresponding to the driver. Here, in the restricted viewing mode B2, when the driver looks at the display screen, the invention allows the driver's perception of the image data shown—in addition to the optical/opto-electronic/electronic switching on of viewing mode B2—to be reduced markedly by an added amount or completely prevented. This circumstance is a big advantage especially in darkish environments, e.g. in night drives, as then the driver's pupil is extended, and even very faint residual light, which, with the viewing mode B2 being switched on by optical/opto-electronic/electronic means, is, as a rule, present on the display screen also from viewing angles actually obstructed, remains perceptible at least by the driver.

Preferably, the eye position is monitored only for viewers located in angular ranges A horizontally between 90 degrees up to greater than 20, 25 or 30 degrees from a vertical bisector of the display area of the screen. In a car, this would correspond to the eye position of the driver, even when he—with the seat belt on—slightly leans toward the front seat passenger. The angular range A can then be taken into account either left or right of the vertical bisector, depending on whether the vehicle has left-hand or right-hand steering.

Furthermore, it may be useful for the eye position to be monitored for only one—or several—viewers located at a maximum distance of 1.2 m from a center point of the display area of the display screen. This will, e.g. in a vehicle, include only the driver as a viewer, but exclude a rear seat passenger. Feasible maximum distances may also be smaller, such as 1 m or 0.8 m.

Moreover, a further development of the invention turns out as advantageous in which one or several text messages and/or one or several symbols are cross-faded with the image data during the time within which the signal S is on. In this connection, text messages such as, e.g., "Image manipulation due to driver distraction" are expedient.

Furthermore, because of this, the front-seat passenger feels prompted to request the driver (the viewer) to stop looking at the display screen. Once the driver (the viewer) looks away from the display screen, so that the signal S is no longer on, the cross-fading of text messages or symbols described above will, of course, be cancelled immediately, as will, if implemented, all image data manipulations according to the invention, and the display will return to the initial image data. Optionally, the said cancellation of the image data manipulations can be extended over a period of, e.g., 5 seconds, in order to provide the direct viewer, whose eye position is not tracked, with a pleasant visual experience.

In principle, variations of the parameters described above will, within certain limits, not detract from the inventive ingenuity.

It is to be understood that the features mentioned before and explained below are applicable not only in the combinations stated but also in other combinations or as standalone features without leaving the scope of the present invention.

BRIEF DESCRIPTION OF THE DRAWINGS

Below, the invention will be explained in more detail with reference to accompanying drawings, which also show features essential to the invention, and in which.

The drawings are not to scale and represent principles only.

DETAILED DESCRIPTION OF THE DRAWINGS

Figure 1:
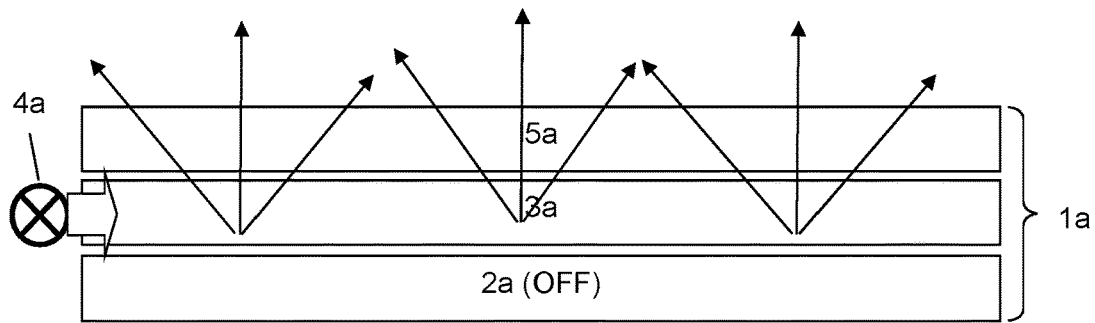
FIG. 1 is a sketch showing the principle of a display screen in mode B1 for a free viewing mode.
Figure 2:
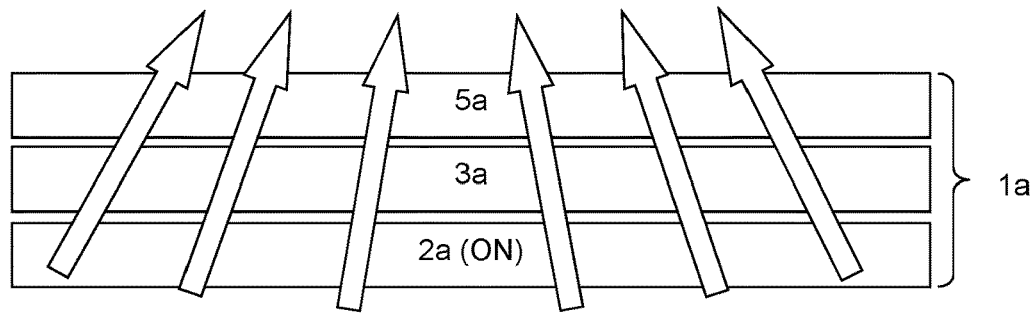
FIG. 2 is a sketch showing the principle of a display screen in mode B2 for a restricted viewing mode.

FIG. 1 is a sketch illustrating the principle of a display screen in mode B1 for a free viewing mode. FIG. 2, on the other hand, is a sketch illustrating the principle of a display screen in mode B2 for a restricted viewing mode. With respect to an exemplary embodiment thereof, refer to the applicant's WO2015/121398 A1 mentioned above, in which the drawings FIGS. 3 and 4, corresponding to drawings FIGS. 1 and 2 which illustrate prior art herein, are described regarding their configuration and manner of operation, which for reasons of redundancy need not be repeated here.

Of course, the display screen 1 may have other embodiments permitting the B1 and B2 modes of operation.

The present invention will now be described especially with the help of drawings FIG. 3 and.

Figure 4:
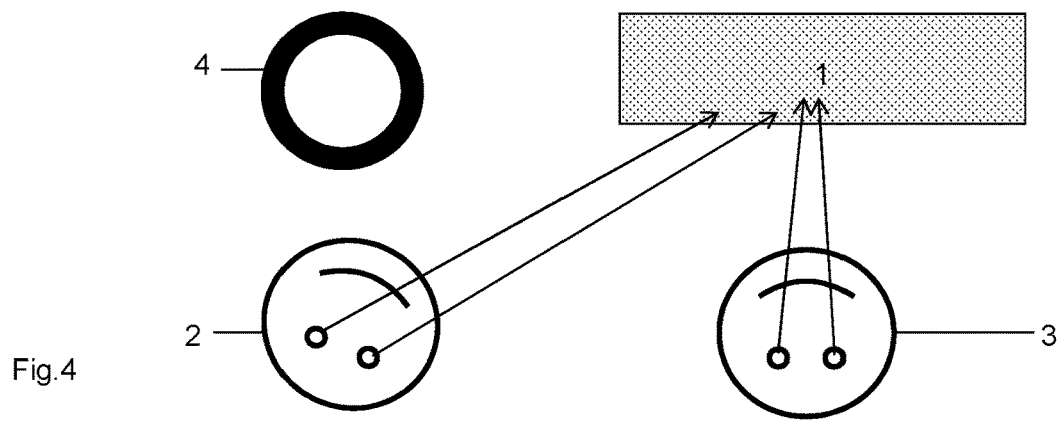
FIG. 4 is a schematic representation of the application of the invention in a vehicle, wherein the invented image manipulation is active.

FIG. 1 is a schematic representation of the application of the invention in a vehicle, with the invented image manipulation being inactive, because the signal S is not on. FIG. 4, on the other hand, is a schematic representation of the application of the invention in a vehicle, with the invented image manipulation being active, because the signal S is on.

The invented method for the manipulation of image data for a display screen 1, which can be operated in at least two modes of operation, viz. B1 for a free viewing mode and B2 for a restricted viewing mode, and which is configured, e.g., according to the teaching of the applicant's WO2015/121398, comprises the following steps, as described above:
 a) Switching on mode B2,
 b) Permanent or recurrent monitoring of the eye position of a viewer 2 within a given angular range A enclosing a vertical bisector of the display screen 1,
  Setting a signal S if the viewer's eye position means that the viewer is looking at the display screen, and
  Cutting off signal S if the viewer's eye position means that the viewer is not looking at the display screen,
 c) Manipulation of the image data shown on the display screen as against the initial image data with regard to contrast, brightness, resolution, color space, cross fades and/or further image parameters, wherein the said manipulation
  i. is performed in such a way as to bring about a deteriorated visual perceptibility of the image data, whereby the quality of the restricted viewing mode B2 is enhanced,
  ii. is implemented dynamically in a control unit of the display screen (1), and
  iii. is performed exclusively during the period in which the signal S is set,
 d) Repetition of steps b) and c) until a given abort condition, e.g., the shutting down of the mode B2.

The said manipulation is, of course, inactive in the free viewing mode B1, i.e., it is not performed in this mode.

Furthermore, as a rule, there is yet another, direct viewer 3, who in operating mode B2 is intended to permanently see the image data on the display screen, and who stays outside the angular range A. In connection with the invention, the eye position of this viewer is irrelevant.

Figure 3:
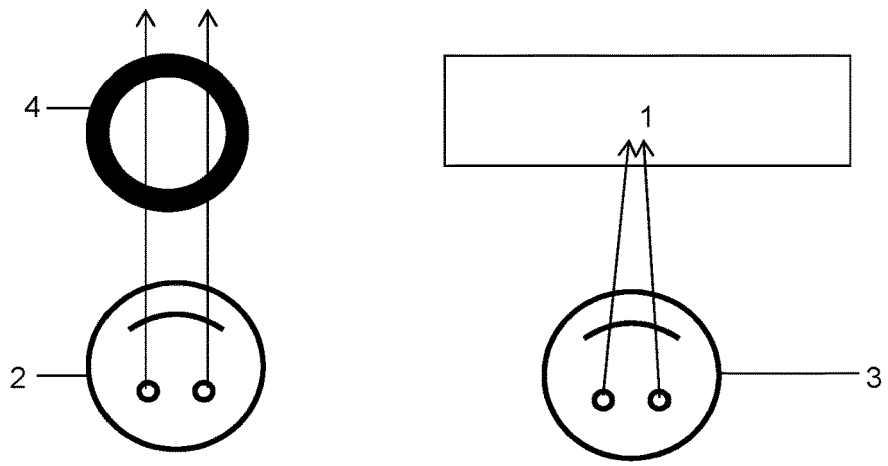
FIG. 3 is a schematic representation of the application of the invention in a vehicle, wherein the invented image manipulation is inactive.

In the embodiment according to FIG. 3, the invention provides for a permanent or recurrent monitoring of the eye position of a viewer 2 within a given angular range A.

FIG. 3 shows that viewer 2 in a vehicle looks above the steering wheel 4. Therefore, signal S is off, and the invented manipulation in step c) is inactive. The front-seat passenger, i.e. viewer 3, now can, in the protected viewing mode B2, undisturbedly watch the contents of the display screen 1 as, for example, internet sites or an entertainment show such as in digital TV.

FIG. 4, on the other hand, is a schematic representation of the application of the invention in a vehicle, with the invented image manipulation according to step c) being active, because the signal S is on. Here, the viewer 2, i.e., the driver, looks at the display screen 1, which is detected by monitoring the eye position. Accordingly, signal S is set (on). Viewer 3 also looks at the display screen 1. Here, however, the invented manipulations of the image data are active, which is suggested by the dotted area of the display screen 1. For viewer 3, of course, the manipulations are also visible, but he can make out the image without any problem, as a rule, due to the restricted viewing angle directed at him in viewing mode B2 of the display screen.

Here, in step c), the respective manipulation(s) is/are performed in such a way that a deteriorated visual perceptibility of the image data is produced, whereby the quality of the restricted viewing mode B2 is enhanced.

This again is possible, for example, in that the said deterioration of visual perceptibility of the image data is produced by decreased contrast and lower brightness compared to the initial image data. The decrease in contrast, same as the brightness reduction, can be implemented, e.g., by adding an appropriate image data filter.

Regarding the lower brightness, though, in case of an LCD screen used as display screen 1, one can simply reduce the brightness of the backlight, as long as the signal S is on. For OLED displays and other screen types, the operating brightness would be reduced accordingly.

The influences on contrast and brightness are implemented dynamically in the control unit of the display screen 1, which is configured as an electronic controller board, for example. This implementation, then, applies to both still and moving pictures, and can additionally be varied in time.

The invented method gains a particular quality if the said deteriorated perceptibility of the image data is modulated in time, and preferably increases with longer time during which the signal S is on. In the exemplary configuration described here, then, brightness and contrast can be reduced further and further, especially with increasing time during which signal S is on, in order to cause the viewing interest of viewer 2 to succumb, without completely withdrawing the image from viewer 3, i.e., the front-seat passenger, by switching it off.

Optionally, however, the display screen 1 can be switched off completely, and/or image display on the display screen 1 be stopped or interrupted, after a given minimum time, say, 10 seconds, during which the signal S is on.

Monitoring the eye position with a slight delay—i.e., with a latency of >0.2, i.e. in real time—is preferably implemented by an eye-tracking system, wherein at least the viewing angle of the two eyes in horizontal and/or vertical direction and optionally the head position of viewer 2 relatively to the display screen 1 should be taken into account for the angular range A, in order to determine whether signal S should be set or not. The said viewing angles of both eyes of viewer 2, i.e. the driver in horizontal and/or vertical direction can be determined in such a way that, for the geometry in a given vehicle for the driver's eyebox—which is an empirically ascertained three-dimensional space in which the pair(s) of eyes of the viewer(s) are located with the highest probability, i.e. more than 95%, as a rule—the corresponding viewing angles of looking at the display screen 1 are determined. In any case, signal S should not be set if viewer 2 is clearly not looking at the display screen 1, i.e. also when he looks past and above the display screen 1, for example.

By way of example, the eye position is monitored only for the eyes of viewer 2, which are located in angular ranges A horizontally between 90 degrees and greater than 20, 25 or 30 degrees from the vertical bisector of the display area of the display screen 1. In a car, this would correspond to the driver, even when he—with the seat belt on—slightly leans toward the front seat passenger, here with the display screen 1 supposedly located horizontally about midways in front of the front seat passenger, i.e. viewer 3. Accordingly, the angular range A can then be taken into account to either the left or the right of the vertical bisector, depending on whether the vehicle has left-hand or right-hand steering.

Suitable eye tracking systems are known in prior art and can be adapted without problems by persons skilled in the art.

With the invented method being applied in a vehicle, when in the restricted viewing mode B2 the display screen 1 is looked at by viewer 2, i.e. the driver, the perceptibility by the driver of the image data displayed is, in addition to the optical/opto-electronic turning on of viewing mode B, subjected to another marked reduction or made completely impossible. This circumstance is a big advantage especially in darkish environments, e.g. in night drives, as then the driver's pupil is extended, and even very faint residual light, which, with the viewing mode B2 being switched on by optical/opto-electronic means, is, as a rule, present on the display screen also from viewing angles actually obstructed, remains at least perceptible by the driver.

Furthermore, it may be useful for the eye position to be monitored for only one (or several) viewers 2 located at a maximum distance of 1.2 m from the center point of the display area of the display screen 1. This will, e.g. in a vehicle, include only the driver as a viewer 2, but exclude a rear seat passenger. Feasible maximum distances may also be smaller, such as 1 m or 0.8 m.

Naturally, the invented method allows consideration also of the eye positions of several viewers 2; here, for setting the signal S it is sufficient if only one viewer looks at the display screen 1.

Moreover, a further development of the invention turns out as advantageous in which one or several text messages and/or one or several symbols are cross-faded with the image data during the time within which the signal S is on. In this connection, text messages such as, e.g., "Image manipulation due to driver distraction" are expedient.

Once the signal S is no longer on because the driver, i.e. viewer 2, looks away from the display screen 1, the cross-fading of text messages or symbols described above will, of course, be cancelled immediately, as are, if implemented, all image data manipulations according to the invention.

The invention described above solves the problem set: By means of the invented method for the manipulation of image data for a display screen it is possible to distinctly enhance the private presentation of information in the restricted viewing mode. Furthermore, the method can be easily implemented.

What is claimed is:

1. A method for the manipulation of image data for a display screen that can be operated in at least two modes of operation, viz B1 for a free viewing mode, in which light is emitted by the display in an unrestricted angular range, and B2 for a restricted viewing mode, in which light is emitted by the display in a restricted angular range, comprising the following steps:
    a) switching on the operating mode B2,
    b) monitoring an eye position of a viewer in a given angular range A enclosing a vertical bisector of the display screen, and
        setting a signal S when the eye position of the viewer signifies that the viewer is looking at the display screen, and
        deleting the signal S, when the eye position of the viewer signifies that the viewer is not looking at the display screen,
    c) manipulating the image data on the display screen as against an initial image data with regard to contrast, brightness, resolution, color space, cross fades and/or further image parameters, wherein the manipulation:
        i. is performed to an effect that a deteriorated visual perceptibility of the image data is brought about, whereby a quality of the restricted viewing mode B2 is enhanced,
        ii. is implemented dynamically in a control unit of the display screen, and
        iii. is performed exclusively during a period in which the signal S is set,
    d) repeating steps b) and c) until an abort condition is reached.

2. The method as claimed in claim 1, wherein the deteriorated visual perceptibility of the image data is brought about by, as against the initial image data, reduced contrast, diminished brightness, diminished resolution, diminished color space and/or static or dynamic cross fades.

3. The method as claimed in claim 1, wherein the deteriorated perceptibility of the image data is modulated temporally.

4. The method as claimed in claim 3, wherein the deterioration of perceptibility of the image increases with the period in which the signal S remains set, with the display screen being completely switched off when a presettable maximum time t during which the signal S remains set is exceeded.

5. The method as claimed in claim 1, wherein die monitoring of the eye position is implemented by an eyetracking system.

6. The method as claimed in claim 1, wherein the monitoring of the eye position takes into account a viewing angle of both eyes in the horizontal and/or vertical direction and the head position relative to the display screen.

7. The method as claimed in claim 1, wherein the eye position is monitored only for viewers located horizontally within the angular range A between 90 degrees and greater than 20 degrees from the vertical bisector of the display area of the display screen and/or at a maximum distance of 1.2 m from a center point of the display area of the display screen.

8. The method as claimed in claim 1, wherein, during the period in which the signal S is set, a text message and/or a symbol is cross-faded.

9. The method of claim 1, wherein steps a, b, c and d are performed inside a vehicle, and the viewer is a driver of the vehicle.

10. The method as claimed in claim 1, wherein the eye position is monitored only for viewers located horizontally within the angular range A between 90 degrees and greater than 25 degrees from the vertical bisector of the display area of the display screen and/or at a maximum distance of 1.2 m from a center point of the display area of the display screen.

11. The method as claimed in claim 1, wherein the eye position is monitored only for viewers located horizontally within the angular range A between 90 degrees and greater than 30 degrees from the vertical bisector of the display area of the display screen and/or at a maximum distance of 1.2 m from a center point of the display area of the display screen.

* * * * *

UNITED STATES PATENT AND TRADEMARK OFFICE
CERTIFICATE OF CORRECTION

PATENT NO. : 11,442,602 B2  
APPLICATION NO. : 17/054449  
DATED : September 13, 2022  
INVENTOR(S) : André Heber et al.

Page 1 of 1

It is certified that error appears in the above-identified patent and that said Letters Patent is hereby corrected as shown below:

On the Title Page

Column 2, Item (57), under "ABSTRACT", Line 2, delete "viz" and insert -- viz. --, therefor.

In the Specification

In Column 3, Line 2, delete "a far" and insert -- as far --, therefor.

In Column 3, Line 16, delete "etc." and insert -- etc., --, therefor.

In the Claims

In Column 7, Claim 1, Line 66, delete "viz" and insert -- viz. --, therefor.

Signed and Sealed this  
Twenty-second Day of November, 2022

Katherine Kelly Vidal  
*Director of the United States Patent and Trademark Office*